US012006624B2

(12) United States Patent
Cho

(10) Patent No.: US 12,006,624 B2
(45) Date of Patent: Jun. 11, 2024

(54) LAUNDRY BAG FOR NON-CONTACT LAUNDRY SERVICE

(71) Applicant: LIFEGOESON COMPANY CORP., Seoul (KR)

(72) Inventor: Sungwoo Cho, Seoul (KR)

(73) Assignee: LIFEGOESON COMPANY CORP., Seoul (KR)

( * ) Notice: Subject to any disclaimer, the term of this patent is extended or adjusted under 35 U.S.C. 154(b) by 410 days.

(21) Appl. No.: 17/415,652

(22) PCT Filed: Dec. 17, 2019

(86) PCT No.: PCT/KR2019/017875

§ 371 (c)(1),
(2) Date: Jun. 17, 2021

(87) PCT Pub. No.: WO2020/130570

PCT Pub. Date: Jun. 25, 2020

(65) Prior Publication Data

US 2022/0074126 A1 Mar. 10, 2022

(30) Foreign Application Priority Data

Dec. 18, 2018 (KR) ........................ 10-2018-0164374
Dec. 5, 2019 (KR) ........................ 10-2019-0161019

(51) Int. Cl.
*D06F 95/00* (2006.01)
*G07C 9/00* (2020.01)
*E05B 73/00* (2006.01)

(52) U.S. Cl.
CPC ....... *D06F 95/002* (2013.01); *G07C 9/00182* (2013.01); *E05B 73/0011* (2013.01); *G07C 2009/0019* (2013.01)

(58) Field of Classification Search
CPC .............. D06F 95/002; G07C 9/00182; G07C 2009/0019; G07C 9/00912; E05B 73/0011; E05B 2047/0095; E05B 2047/0097
See application file for complete search history.

(56) References Cited

U.S. PATENT DOCUMENTS 2,230,951 A * 2/1941 Hyde .................... D06F 95/002 248/318
3,920,260 A * 11/1975 Downing ................ B62B 3/006 280/47.35
4,050,492 A * 9/1977 Veilleux .............. B65B 67/1244 383/23

(Continued)

FOREIGN PATENT DOCUMENTS

KR 20-1999-0041530 U 12/1999
KR 10-2017-0011003 A 2/2017

(Continued)

*Primary Examiner* — Curtis J King
(74) *Attorney, Agent, or Firm* — Muncy, Geissler, Olds & Lowe, P.C.

(57) ABSTRACT

The present invention relates to a laundry container for a contactless laundry service including a body which provides a space in which laundry is accommodated, a first latching device provided to be attachable to and detachable from a user's door, and a second latching device provided to open or close the laundry container, wherein at least a part of the first latching device is provided to be inserted into the body.

8 Claims, 4 Drawing Sheets

(56) References Cited

U.S. PATENT DOCUMENTS

| | | | | | |
|---|---|---|---|---|---|
| 5,090,559 | A * | 2/1992 | Gendreau | A47G 25/54 383/41 |
| 5,347,833 | A * | 9/1994 | Branscum | A47G 25/54 70/59 |
| 5,624,071 | A * | 4/1997 | Sosan | E05B 67/003 232/29 |
| 6,036,204 | A * | 3/2000 | Craft | B65F 1/1468 220/762 |
| 6,155,715 | A * | 12/2000 | Lake | A47G 29/20 70/64 |
| 6,224,259 | B1 * | 5/2001 | Guerra | D06F 95/006 383/117 |
| 6,398,410 | B1 * | 6/2002 | Guerra | D06F 95/006 383/117 |
| 7,086,255 | B2 * | 8/2006 | Reason | E05B 73/00 70/2 |
| 7,431,555 | B2 * | 10/2008 | Liberman | G06Q 10/08 414/787 |
| 7,913,829 | B1 * | 3/2011 | Pratte | B65G 11/023 193/2 R |
| 8,358,199 | B2 * | 1/2013 | Nesling | G07C 9/00912 340/568.1 |
| 9,364,112 | B2 * | 6/2016 | Sundaresan | A47G 29/20 |
| 9,926,108 | B2 * | 3/2018 | Wiley | A47G 29/141 |
| 10,143,320 | B1 * | 12/2018 | Batts | A47G 29/16 |
| 10,282,951 | B1 * | 5/2019 | Kulick | A47G 29/141 |
| 10,653,261 | B2 * | 5/2020 | Loures | E05B 67/383 |
| 11,330,926 | B1 * | 5/2022 | Root | A47G 29/20 |
| 11,766,147 | B2 * | 9/2023 | Benevento | A47G 29/124 232/19 |
| 2003/0108254 | A1 * | 6/2003 | Watkins | D06F 95/004 383/33 |
| 2003/0201291 | A1 * | 10/2003 | Kestler | D06F 95/004 224/584 |
| 2003/0218307 | A1 * | 11/2003 | Anderson | B62B 3/005 280/79.2 |
| 2003/0230924 | A1 * | 12/2003 | Davidovic | D06F 95/002 298/1 B |
| 2006/0096337 | A1 * | 5/2006 | Walton | D06F 95/002 68/213 |
| 2009/0113638 | A1 * | 5/2009 | Kim | D06F 93/00 68/12.02 |
| 2011/0203478 | A1 * | 8/2011 | Kessler | B60P 3/05 104/91 |
| 2014/0224681 | A1 * | 8/2014 | McCune | A47G 29/087 206/278 |
| 2015/0118107 | A1 * | 4/2015 | Sunkara | A61L 2/10 250/455.11 |
| 2016/0121916 | A1 * | 5/2016 | Kassab Arabo | B62B 3/025 280/37 |
| 2019/0047356 | A1 * | 2/2019 | Ferguson | G05D 1/0297 |
| 2021/0007523 | A1 * | 1/2021 | Baek | A47G 29/141 |
| 2021/0254269 | A1 * | 8/2021 | Fujii | G01C 21/3438 |
| 2022/0341088 | A1 * | 10/2022 | Laster | B62B 5/06 |

FOREIGN PATENT DOCUMENTS

| | | | |
|---|---|---|---|
| KR | 10-2017-0119165 | A | 10/2017 |
| KR | 10-2018-0105777 | A | 10/2018 |
| KR | 10-1896658 | B1 | 10/2018 |

* cited by examiner

LAUNDRY BAG FOR NON-CONTACT LAUNDRY SERVICE

BACKGROUND

1. Field of the Invention

The present invention relates to a laundry container for a contactless laundry service.

2. Discussion of Related Art

Washing for restoring an original state of clothes by removing contaminants such as dirt and dust in a physical manner and a chemical manner is divided into two types including water washing (wet washing) for removing contaminants generally using water and a detergent and dry cleaning (dry washing) for removing contaminants using an organic solvent. The water washing may be easily performed at home because it mainly uses water, but the dry cleaning method is mainly professionally performed in a laundry shop because it requires specific equipment and technology, and thus, is effective for clothes which have a risk of being damaged by water or detergent or of which a shape of a material may be changed.

Currently, not only washing such as dry cleaning, but also water washing and clothes repair are performed in laundry shops, and laundry shops are becoming more widespread, gradually becoming larger, and becoming specialized and mechanized at the same time.

In laundry service methods in such a general laundry shop, there is a method in which a customer visits the laundry shop to drop off laundry and check a laundry schedule, and there is a method in which a laundry shop owner visits a customer's home to collect laundry and present a laundry schedule.

In such methods, the customer visits the laundry shop, or the laundry shop owner visits the customer's home. Therefore, in a case in which the laundry shop owner is not present due to delivery when the customer visits the laundry shop, there is inconvenience in that the customer should wait until the owner returns or revisit the laundry shop again later.

In addition, from an owner's perspective, since the laundry shop owner should visit all customer's homes, time loss and physical pain may occur, and in a case in which the laundry shop owner delivers laundry, since the laundry shop owner cannot receive a request for laundry even when the customer visits the laundry shop, there is a problem in that an economic loss occurs.

Generally, a laundry shop is located in a shopping district of an apartment which is a residential area, and a laundry collector of the laundry shop receives a request through a telephone call for the sake of convenience of a resident, visits a customer to collect laundry, or walks around halls of the apartment and shouts to collect laundry at a predetermined time.

However, in the above-described method, since the laundry collector should shout while walking around apartment buildings at the predetermined time, in a case in which residents of the apartment do not respond, there is a disadvantage in that a considerable amount of labor is wasted.

That is, in an apartment including a plurality of houses, since there are more cases in which laundry is taken out at times at which the residents want instead of being taken out by all the residents at a time predetermined by the laundry collector, most laundry collectors waste considerable amounts of labor for the convenience of the residents even while putting up with the inconvenience described above.

In addition, conventionally, even when the laundry collector shouts for collecting laundry while walking around the halls of an apartment building, in a case in which there is no request for washing, there is a negative effect of unnecessarily wasting an amount of labor, and there is also a problem in that, occasionally, among the apartment residents, some residents perceive the laundry collector's shouting as noise and file a civil complaint.

In addition, even when the laundry shop provides collection/delivery services, a visiting time of laundry staff is not constant, and it is also not easy to set up an appointment and spare that time.

Accordingly, a method of leaving laundry in front of a front door may be considered, but such a method has a problem of loss or privacy exposure due to the laundry being seen by others.

SUMMARY OF THE INVENTION

Therefore, the present invention is directed to providing a laundry container allowing busy modern people to use a laundry service without specially sharing a time and without a problem of loss or privacy exposure when using the laundry service.

According to an aspect of the present invention, there is provided a laundry container for a contactless laundry service including a body which provides a space in which laundry is accommodated, a first latching device provided to be attachable to and detachable from a user's door, and a second latching device provided to open or close the laundry container, wherein at least a part of the first latching device is provided to be inserted into the body.

The first latching device may include a door connecting part provided to be attachable to and detachable from a part of the user's door, a body insertion part provided to be inserted into the body, and a wire which connects the door connecting part and the body insertion part.

The wire may be provided to be wound in the body insertion part.

The laundry container may include a power supply part which supplies power to the second latching device, a controller which controls the second latching device, a latching operating part which opens or closes the second latching device according to a control signal of the controller, and a transceiver which transmits or receives a signal to or from a smartphone of a user, wherein the controller may generate the control signal using the signal received from the transceiver.

The laundry container may further include a power sensor which detects remaining power of the power supply part, wherein the power sensor may transmit information about the remaining power of the power supply part to the smartphone of the user through the transceiver.

The laundry container may further include a power blocking part which blocks power being supplied by the power part, wherein the power blocking part may be provided to block the power being supplied by the power part in a preset state.

The body may include a main frame which provides a space in which the laundry is accommodated, one or more sub-frames provided at one surface of the main frame, and a cover member provided to surround the main frame and the one or more sub-frames.

The one or more sub-frames may include a first sub-frame provided in an upper portion of the main frame, and a second sub-frame provided in a lower portion of the main frame.

The main frame may be provided to be folded by the first sub-frame and the second sub-frame.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
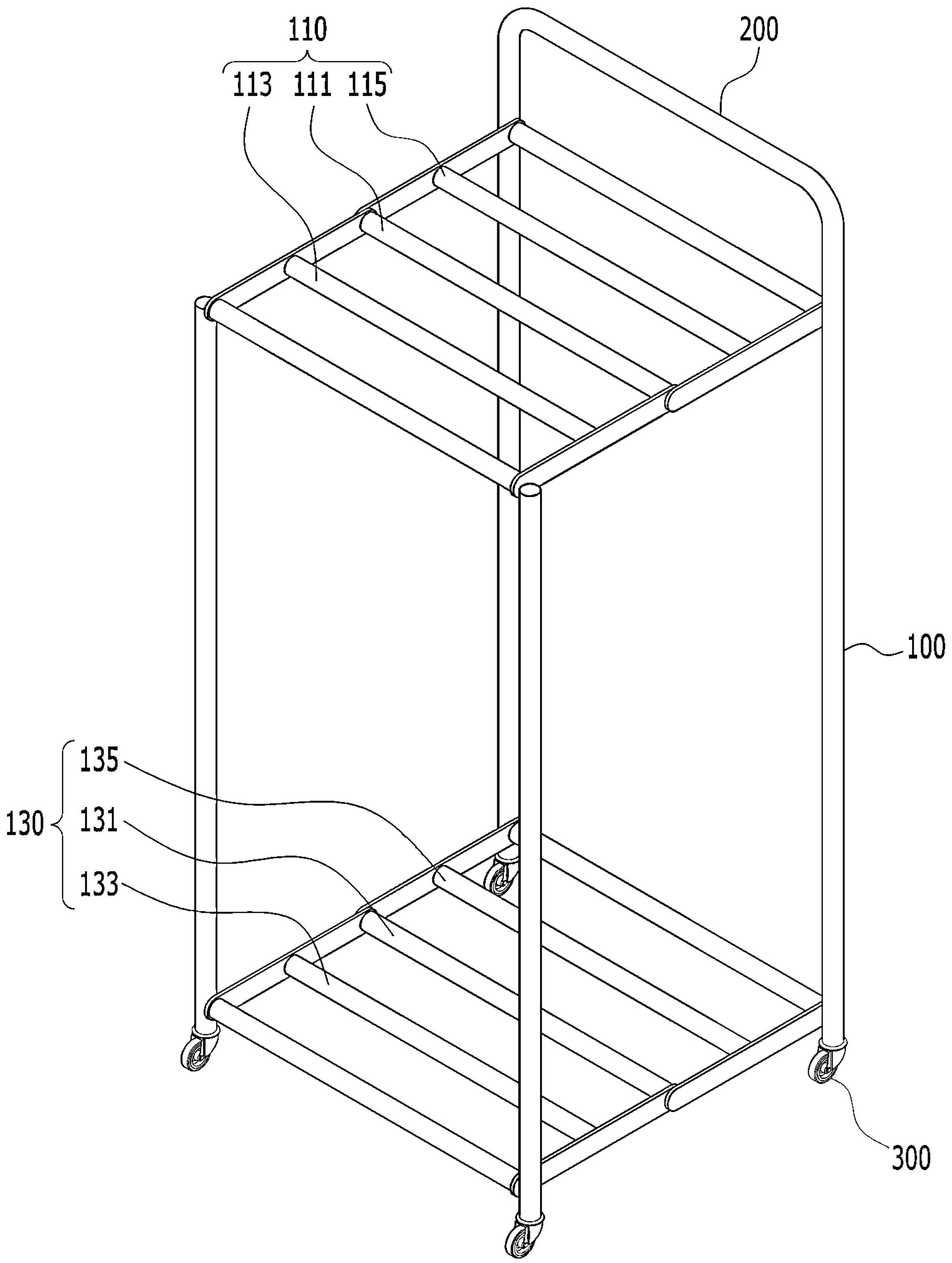
FIG. 1 is a view illustrating a state in which a laundry container according to one embodiment of the present invention is unfolded.

Hereinafter, embodiments of the present invention will be described in detail with reference to the accompanying drawings in order for those skilled in the art to easily perform the present invention. However, the present invention may be implemented in various different forms and is not limited to the embodiments described herein. In addition, parts irrelevant to descriptions are omitted in the drawings in order to clearly explain the present invention, and the same or similar parts are denoted by the same reference numerals throughout this specification.

When a certain part "includes" a certain component throughout the specification, this does not exclude other components unless explicitly described otherwise, and other components may further be included. In addition, parts described with the same reference numerals are the same parts.

Since sizes and thicknesses of components in the drawings are arbitrarily illustrated for the sake of convenience of description, the present invention is not necessarily limited thereto, and the thicknesses of components in the drawings have been enlarged to illustrate various portions and regions clearly.

In addition, when a certain part "includes" a certain component throughout the specification, this does not exclude other components unless explicitly described otherwise, and other components may further be included.

In addition, terms such as "unit," "method," part," and "member" described in the specification denote a unit of a comprehensive configuration which performs at least one function or operation.

Figure 2:
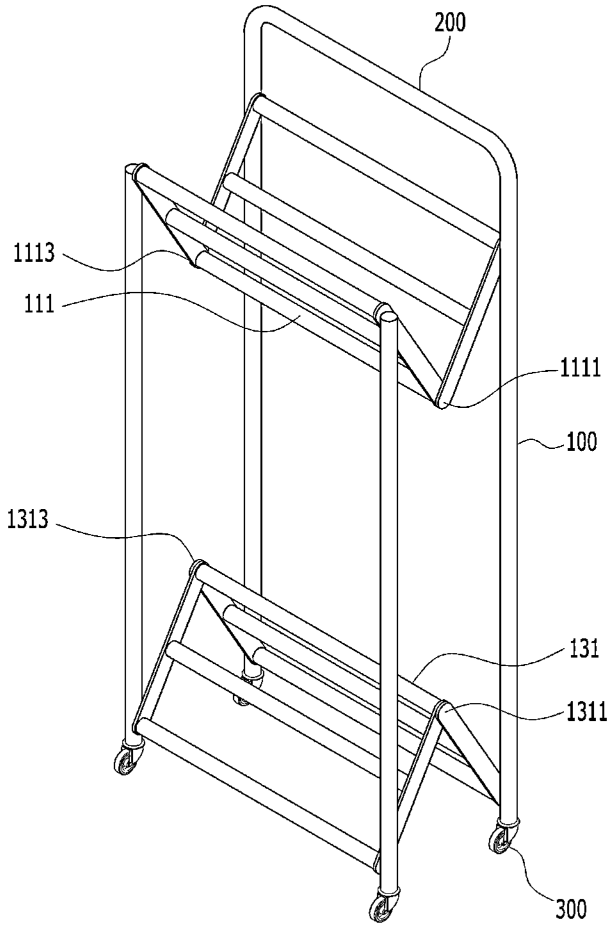
FIG. 2 is a view illustrating a state in which the laundry container according to one embodiment of the present invention is folded.

FIG. 1 is a view illustrating a state in which a laundry container according to one embodiment of the present invention is unfolded, and FIG. 2 is a view illustrating a state in which the laundry container according to one embodiment of the present invention is folded.

Referring to FIGS. 1 and 2, the laundry container according to one embodiment of the present invention may include a main frame 100 for providing a space in which laundry is accommodated, a first sub-frame 110 provided at one side surface of the main frame 100, a second sub-frame 130 provided at the other side surface of the main frame 100, one or more wheels 300 provided on a lower end of the main frame 100, and a handle part 200 provided on an upper end of the main frame 100.

The first sub-frame 110 may include one or more rods for providing a space in which a hanger is accommodated.

The one or more rods may be provided to include a first central rod 111 provided at a center, a first right rod 115 disposed to be spaced a predetermined distance to the right of the first central rod 111, and a first left rod 113 disposed to be spaced a predetermined distance to the left of the first central rod 111.

In addition, the second sub-frame 130 may include at least one or more rods for proving the space in which the hanger is accommodated.

The one or more rods are provided to include a second central rod 131 provided at a center, a second right rod 135 disposed to be spaced a predetermined distance to the right of the second central rod 131, and a second left rod 133 disposed to be spaced a predetermined distance to the left of the second central rod 131.

The one or more rods provided on each of the first sub-frame and the second sub-frame are described as an example for the sake of convenience in the description, and a user may change a shape and the number of the rods according to necessity of the user. In addition, the scope of the present invention is not limited thereto.

As illustrated in FIG. 2, each of the first sub-frame 110 and the second sub-frame 130 may be provided to be folded, and each of the first central rod 111 and the second central rod 131 may become a rotation center.

More specifically, hinge structures 1111 and 1113 may be provided at both ends of the first central rod 111, and hinge structures 1311 and 1313 may also be provided at both ends of the second central rod 131.

Accordingly, the main frame 100 can be folded toward a center.

Since the main frame 100 can be folded toward the center, in a case in which laundry is not accommodated therein, the laundry container may be horizontally stacked, and thus there is an effect in that a space occupied by the laundry container is reduced when the laundry container is stored.

In FIGS. 1 and 2, it is illustrated that only the first sub-frame 110 and the second sub-frame 130 are provided, and the description is based on this, but the user may additionally supplement a plurality of sub-frames between the first sub-frame 110 and the second sub-frame 130, and the scope of the present invention is not limited to the embodiment illustrated in FIGS. 1 and 2.

Figure 3:
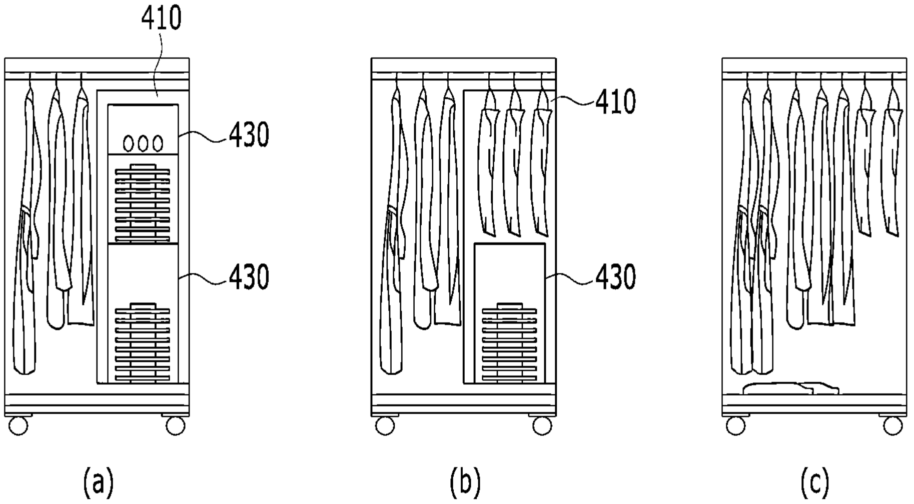
FIG. 3 is a set of views illustrating various methods of accommodating laundry in the laundry container according to one embodiment of the present invention.

FIG. 3 is a set of views illustrating various methods of accommodating laundry in the laundry container according to one embodiment of the present invention.

Referring to FIG. 3A, in the case of a coat or jacket, the laundry container may accommodate the coat or jacket on the hanger and may not accommodate additional laundry on a lower end to prevent laundry from being folded after washing.

However, in a case in which the user accommodates not only the coat or jacket but also a dress shirt or pants, the laundry container may include a laundry accommodation module 410 in order to improve space utilization in the laundry container.

The laundry accommodation module 410 may be provided so that one or more sub-storage modules 430 are stacked therein.

Accordingly, in a case in which laundry accommodated in the laundry container is not only the coat and the jacket but also the dress shirt, which is stackable, the laundry accommodation module 410 is put in the laundry container, and the one or more sub-storage modules 430 are stacked in the laundry accommodation module 410 to prevent a phenomenon in which the laundry is wrinkled due to relative movement or damaged due to friction when the laundry container is moved.

Referring to FIG. 3B, in a case in which the user stores not only a coat or jacket but also a dress shirt and pants in the laundry container, in order to improve space utilization in the laundry container, the sub-storage module 430 is stacked in the laundry accommodation module 410 to a level which does not meet an end of the pants so that the laundry such as the dress shirt, which is stackable, can be accommodated in the laundry accommodation module 410.

In a case of FIG. 3C, only a coat, a jacket, and pants, which are somewhat long, are accommodated, and in this case, since there is no laundry accommodated in a stack, the laundry accommodation module 410 and the sub-storage module 430 do not needed to be used, and the laundry container may be used only to hang the coat, jacket, and pants using the sub-frame.

A space utilization example for maximizing the space utilization in the laundry container and safely accommodating the laundry has been described above.

However, this is one embodiment for the sake of convenience in the description, and the user may variously change an inner space of the laundry container as necessary, and the scope of the present invention is not limited thereto.

Figure 4:
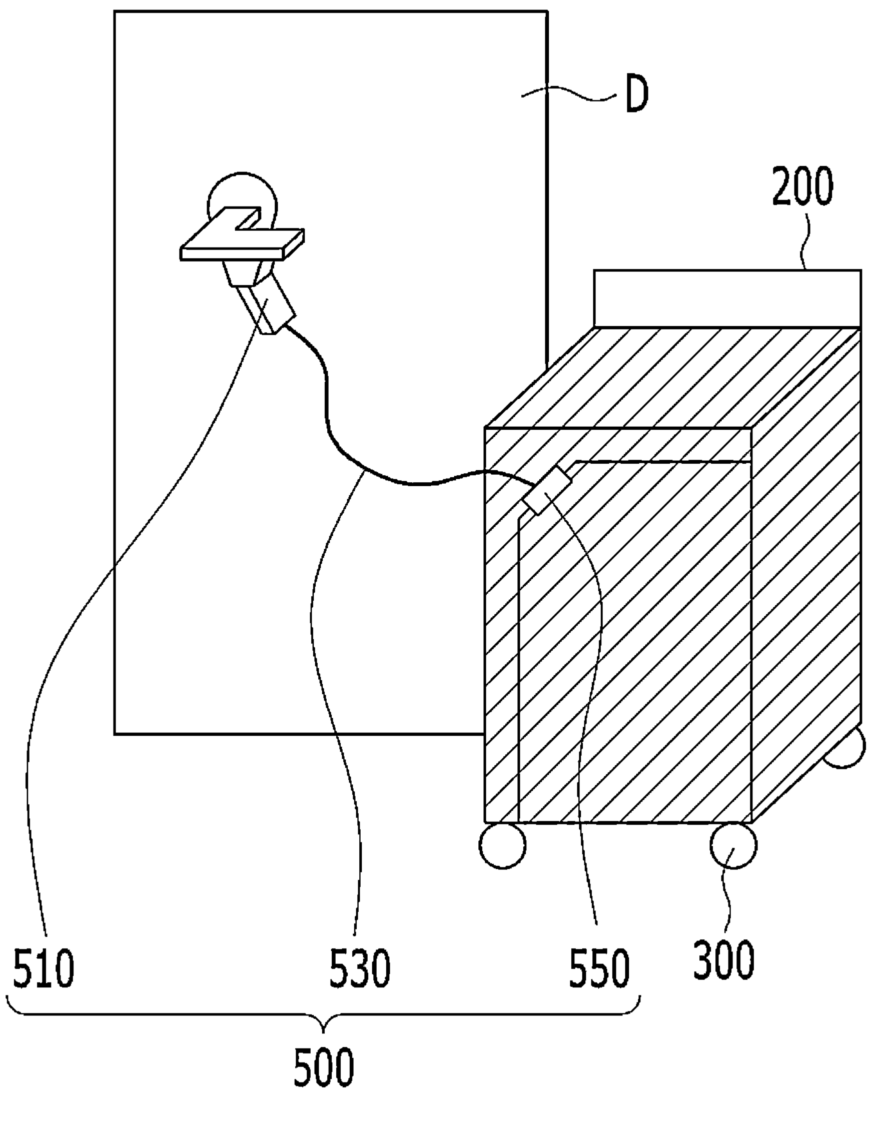
FIG. 4 is a view illustrating that the laundry container according to one embodiment of the present invention is installed to be latched to a door of a user.

FIG. 4 is a view illustrating that the laundry container according to one embodiment of the present invention is installed to be latched to a door of a user.

Referring to FIG. 4, the laundry container of the present invention may include a wire 530 connected to a laundry latching device 550 in a state in which the laundry container is restricted from being exposed to the outside by the laundry latching device 550 and a handle latching device 510 which is connected to the wire 530 and locks the wire and a handle of a door D provided at a user's house.

As described above, since the lives of modern people are so busy, cases in which completely washed laundry should be left in front of the user's door occur.

In such cases, there is a possibility of the laundry container left in front of the door being lost, and in a case in which there is no latching device of the laundry, there is also a possibility of the laundry accommodated in the laundry container being lost.

In order to prevent such a problem, the handle latching device 510 serves to latch a connection of the laundry container and the user's door, and the laundry latching device 550 serves to latch the laundry container.

Accordingly, a problem of the laundry container and laundry accommodated in the laundry container being lost can be prevented.

Although this will be described in more detail below, the laundry container may be provided so that the user may perform both latching and releasing functions of the laundry latching device 550 and the handle latching device 510 by using a smartphone.

Figure 5:
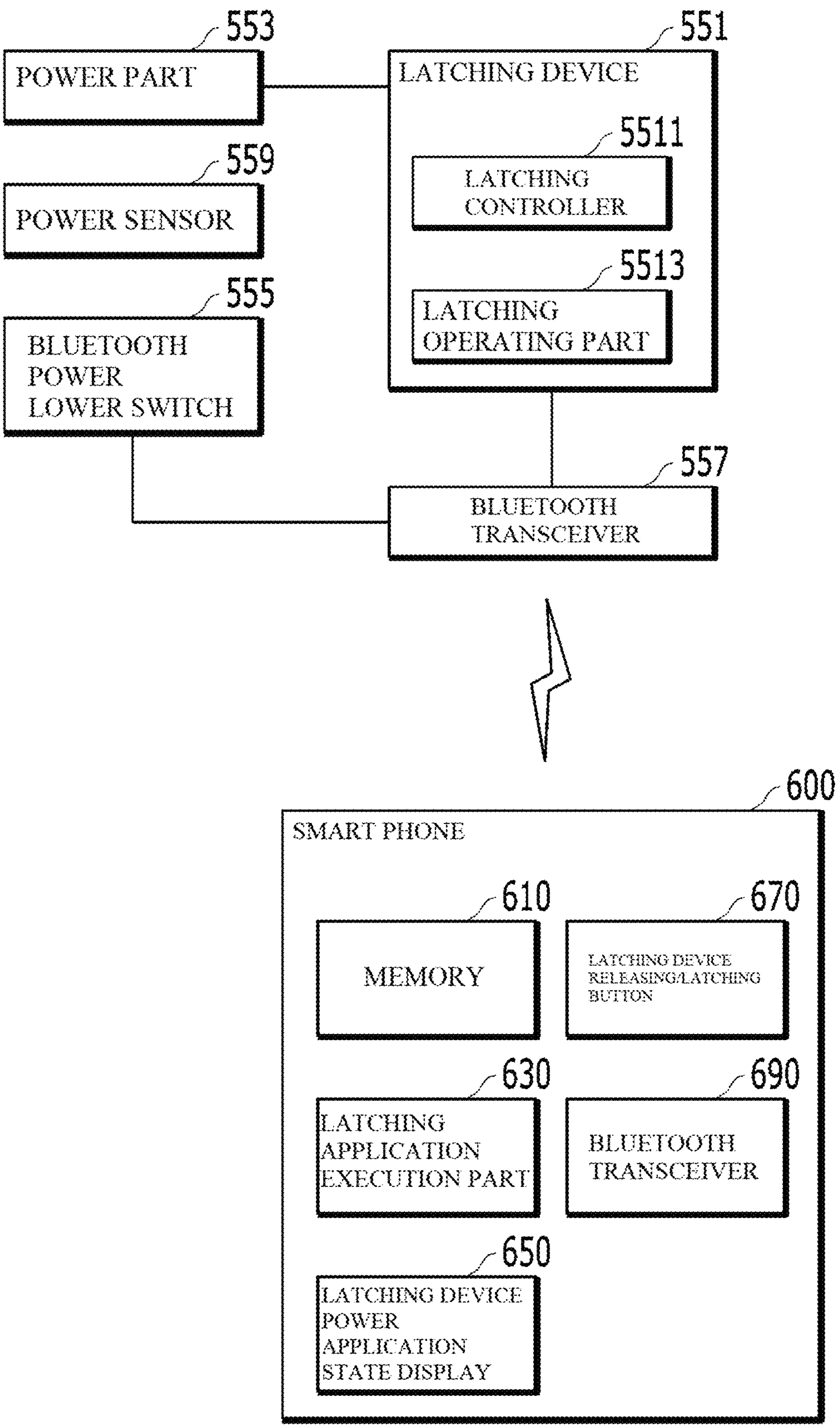
FIG. 5 is a block diagram illustrating a configuration of the laundry container and a smartphone according to one embodiment of the present invention.

FIG. 5 is a block diagram illustrating a configuration of the laundry container and the smartphone according to one embodiment of the present invention.

Referring to FIG. 5, the essential objective of the present invention that the laundry container should be simply latched or released using the smartphone of the user so that the user can receive laundry at any time in a state in which the laundry container according to one embodiment of the present invention is left in a latched state in front of the user's door may be achieved.

Accordingly, the laundry container according to one embodiment of the present invention may include a latching device 551, a power part 553 which supplies power to the latching device 551, a power sensor 559 which detects remaining power of the power part 553, and a Bluetooth transceiver 557 which transmits/receives a signal to/from a smartphone 600 of the user.

In addition, the latching device 551 may include a latching controller 5511 which controls the latching device and a latching operating part 5513 which performs a latching operation according to a control signal of the latching controller 5511.

The power sensor 559 may serve to detect the remaining power of the power part 553 and transmit information about the detected remaining power of the power part 553 to the Bluetooth transceiver 557, and the information of the power of the power part 553 transmitted to the Bluetooth transceiver 557 may be transmitted to a Bluetooth transceiver 690 of the smartphone 600.

As described above, the information of the power of the power part 553 transmitted to the smartphone 600 of the user may be transmitted to a server of a manager through the Internet in real time, and the manager may manage the remaining power of the power part 553 of the laundry container in real time.

Meanwhile, the laundry container of the present invention may further include a Bluetooth power blocking switch 555 capable of blocking power transmitted to the latching device 551 and the Bluetooth transceiver 557 from the power part 553.

Since the Bluetooth power blocking switch 555 may block the power transmitted to the latching device 551 and the Bluetooth transceiver 557 normally, the power is blocked from being transmitted to the latching device 551 or the Bluetooth transceiver 557, and thus there is an effect in that power consumption in a standby state can be minimized.

One embodiment of an operation of the latching device of the laundry container will be described simply. The user may execute a latching application execution part 630 provided in the smartphone 600 of the user to execute a latching application which controls the latching device of the laundry container, and in this case, the user may check whether power is applied to the latching device through a latching device power application state display 650.

When the user operates a latching device releasing/latching button 670, a control signal is transmitted to the Bluetooth transceiver 557 of the latching device through the Bluetooth transceiver 690 of the smartphone.

When the control signal is transmitted to the Bluetooth transceiver 557 of the latching device, the Bluetooth power blocking switch 555 is released so that a standby state of the latching device is released, the control signal is transmitted to the latching controller 5511 of the latching device 551, and the latching controller 5511 operates the latching operating part 5513 according to the control signal.

As described above, by the user simply operating the smartphone 600, latching of the laundry container according to one embodiment of the present invention may be released or set.

According to the present invention, a laundry container can be provided for busy modern people to use a laundry service without specially sharing a time and without a problem of loss or privacy exposure when using the laundry service.

The above description of the present invention is only exemplary, and it will be understood by those skilled in the art that the invention may be embodied in other specific forms without changing the technical spirit or essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined by the appended claims and encompasses all modifications or alterations derived from meanings, the scope, and equivalents of the appended claims.

INDUSTRIAL APPLICABILITY

The present invention is industrially applicable in the field of a contactless laundry service.

What is claimed is:

1. A laundry container for a contactless laundry service, comprising:

a body providing a space in which laundry is accommodated;

a first latching device provided to be attachable to and detachable from a user's door;

a second latching device provided to open or close the laundry container;

a power supply part which supplies power to the second latching device;

a controller which controls the second latching device;

a latching operating part which opens or closes the second latching device according to a control signal of the controller; and a transceiver which transmits or receives a signal to or from a smartphone of a user, wherein at least a part of the first latching device is provided to be inserted into the body, and wherein the controller generates the control signal using the signal received from the transceiver.

2. The laundry container of claim 1, wherein the first latching device comprises:

a door connecting part provided to be attachable to and detachable from a part of the user's door;

a body insertion part provided to be inserted into the body; and a wire which connects the door connecting part and the body insertion part.

3. The laundry container of claim 2, wherein the wire is provided to be wound in the body insertion part.

4. The laundry container of claim 1, further comprising a power sensor which detects remaining power of the power supply part, wherein the power sensor transmits information about the remaining power of the power supply part to the smartphone of the user through the transceiver.

5. The laundry container of claim 4, further comprising a power blocking part which blocks power being supplied by the power supply part, wherein the power blocking part is provided to block the power being supplied by the power supply part in a preset state.

6. A laundry container for a contactless laundry service, comprising:

a body which provides a space in which laundry is accommodated;

a first latching device provided to be attachable to and detachable from a user's door; and a second latching device provided to open or close the laundry container, wherein at least a part of the first latching device is provided to be inserted into the body, wherein the body comprises:

a main frame which provides a space in which the laundry is accommodated;

one or more sub-frames provided at one surface of the main frame; and a cover member provided to surround the main frame and the one or more sub-frames.

7. The laundry container of claim 6, wherein the one or more sub-frames comprises:

a first sub-frame provided in an upper portion of the main frame; and a second sub-frame provided in a lower portion of the main frame.

8. The laundry container of claim 7, wherein the main frame is provided to be folded by the first sub-frame and the second sub-frame.

* * * * *